United States Patent Office 3,283,245
Patented Nov. 1, 1966

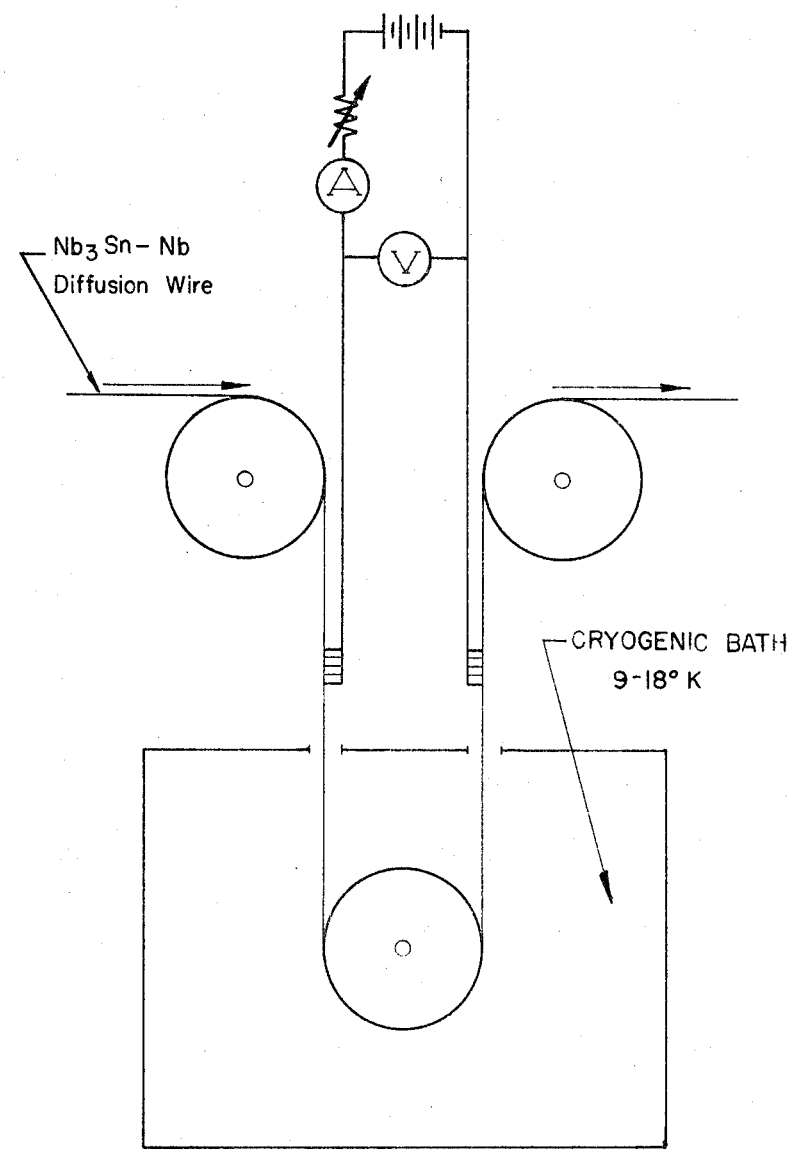

3,283,245
INDIRECT PROCESS FOR TESTING HARD SUPERCONDUCTOR LAYERS
Robert A. Stauffer, Weston, Mass., assignor, by mesne assignments, to National Research Corporation, a corporation of Massachusetts
Filed Jan. 28, 1963, Ser. No. 254,460
2 Claims. (Cl. 324—64)

The invention relates to the industrial production of hard superconductors. These are intermetallic alloys used in the production of high field magnets.

A considerable item of expense and inconvenience in fabricating such items is that, if the paths of intermetallic are not continuous throughout the length of the superconductor, it must be rejected. Testing for this condition is complicated by the fact that the individual elements of such intermetallics are superconductive. At present, this problem is only avoided by exposing the completed superconductor to a high magnetic field which is sufficient to quench superconductivity attributable to the individual elements.

The superconductor $Nb_3Sn$ is made by reacting niobium and tin to form the intermetallic. In situations where the process fails to provide complete paths of $Nb_3Sn$, paths of niobium may give spurious readings of superconductivity. The use of external magnets which must provide a high field in a test zone at cryogenic temperatures is very difficult in laboratory operations and would impose considerable additional costs in commercial processes for making superconductors.

It is therefore the object of this invention to provide a new method of testing $Nb_3Sn$ superconductors in a manner which will be reliable, yet inexpensive.

It is a further object of this invention to provide a testing method which will give a quantitative figure of merit to superconductors without expensive direct testing.

The figure shows an illustration of an embodiment according to my invention.

In accord with the process of the invention, a wire to be tested for superconductivity is dipped in a cryogenic bath. The bath is maintained at a temperature higher than the transition temperature of any of the components, but lower than that of the desired intermetallic. Thus, for a wire made by reacting niobium and tin to form $Nb_3Sn$, the bath is maintained at a temperature in the range 9° K.–18° K. This is low enough so that if continuous paths of $Nb_3Sn$ are present, the wire will exhibit superconductivity. If such parts are not present, there will be no spurious superconductivity readings, due to niobium, since the superconductivity of niobium does not appear at 9° K. and above.

The presence of superconductivity is determined by noting the absence of a voltage drop across a test length of the sample when an electrical current is passed through it. Voltage drops due to contact resistance must be subtracted to give a true reading as to the test length.

Another aspect of the invention is that it can give a figure of merit to superconductors. Where the superconductor is tested under conditions of high current, it generates its own high field which induces current. It is very difficult to make a proper allowance for this self-induced field. However, critical current decreases markedly as the temperature of the cryogenic bath approaches the transition temperature. Only small currents can be carried superconductively at high temperatures. If the cryogenic bath is maintained between 15 and 18° K. for $Nb_3Sn$, the self-induced current will be negligible. Then, the current reading at these high temperatures can be extrapolated to predict the high current which the superconductor will carry under typical conditions of use, e.g. 4.2° K., the boiling point of liquid helium.

The invention is generally applicable to hard superconductors having small cross-sections of current carrying area such as those described in the copending application of Allen and Stauffer, S.N. 133,653, filed August 24, 1961. However, it may be applied to large cross-section hard superconductors, such as those described by Laquer (High Magnetic Fields, Kolm et al., Editor, 1962, Wiley, New York, pp. 156–165), by imposing an external field to limit critical currents to manageable ratings.

Since certain changes may be made in the above process without departing from the scope of the invention herein involved, it is intended that all matter contained in the above description shall be interpreted as illustrative and not in a limiting sense.

What is claimed is:

1. A new method of quality control testing of superconductors of the type comprising a $Nb_3Sn$ layer formed by diffusion reaction along the length of a continuous layer of niobium, such as a niobium wire, the new method comprising the steps of placing the superconductor into a cryogenic bath; holding the temperature of said bath at a temperature between 9 and 18° K.; passing an electrical current through the superconductor; varying the current; measuring the electrical current at zero voltage drop whereby the completeness of the $Nb_3Sn$ layer is indicated; and extrapolating from said electrical current measured at zero voltage drop the actual critical current of the superconductor at standard operating temperatures below 9° K.

2. The method of claim 1 wherein the bath is maintained between 15 and 18° K., whereby self-induced fields are substantially eliminated.

References Cited by the Examiner

UNITED STATES PATENTS 3,056,889 10/1962 Nyberg.
3,181,936 5/1965 Denny et al.

OTHER REFERENCES

Hewlett, General Electric Review, "Superconductivity," June 1946, pp. 19–25.

WALTER L. CARLSON, *Primary Examiner.*

E. E. KUBASIEWICZ, *Assistant Examiner.*